May 6, 1958 G. W. MIDDLETON 2,833,478
THERMOSTATIC CONTROL OF WATER COOLING SYSTEM OF MOTOR VEHICLE
Filed June 9, 1955 3 Sheets-Sheet 1
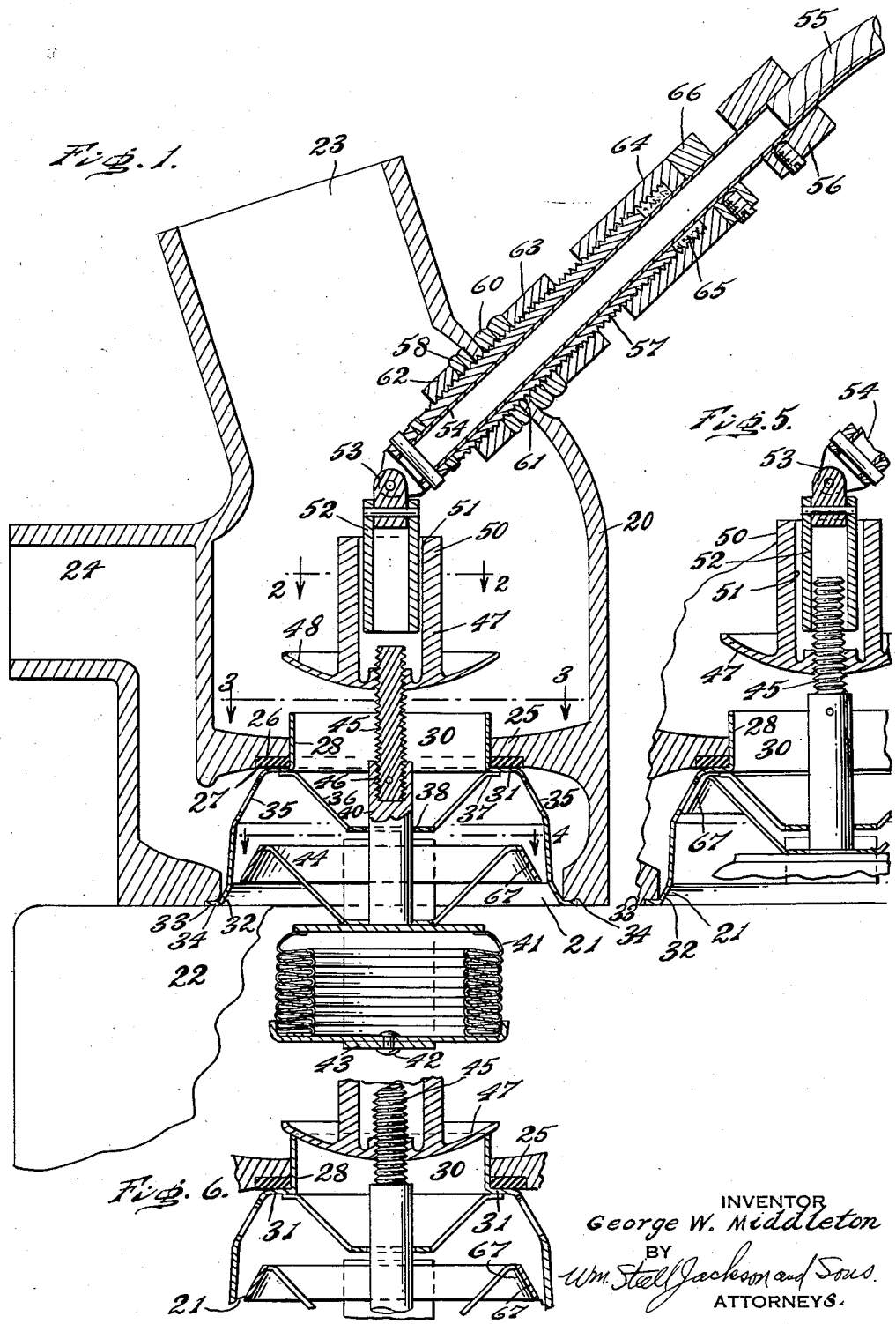
INVENTOR
George W. Middleton
BY
Wm. Steel Jackson and Sons.
ATTORNEYS.

May 6, 1958 G. W. MIDDLETON 2,833,478
THERMOSTATIC CONTROL OF WATER COOLING SYSTEM OF MOTOR VEHICLE
Filed June 9, 1955 3 Sheets-Sheet 2
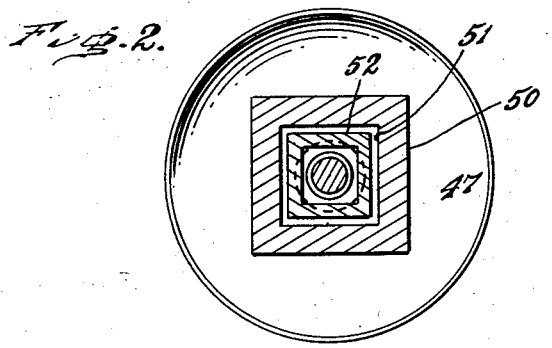
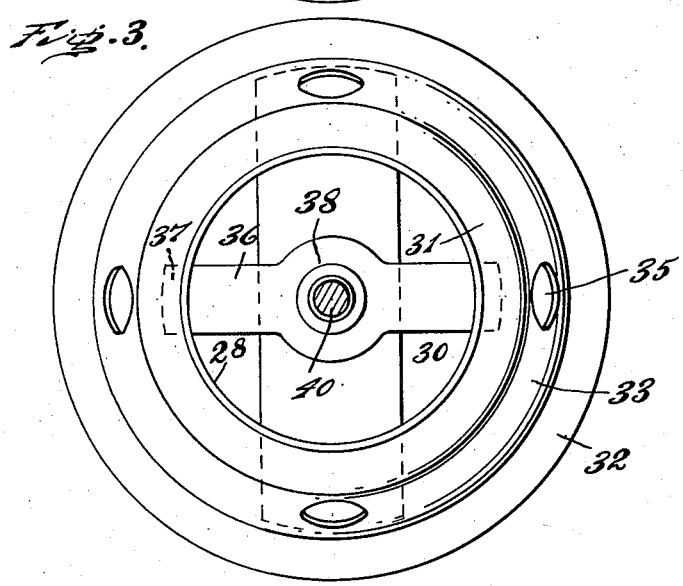
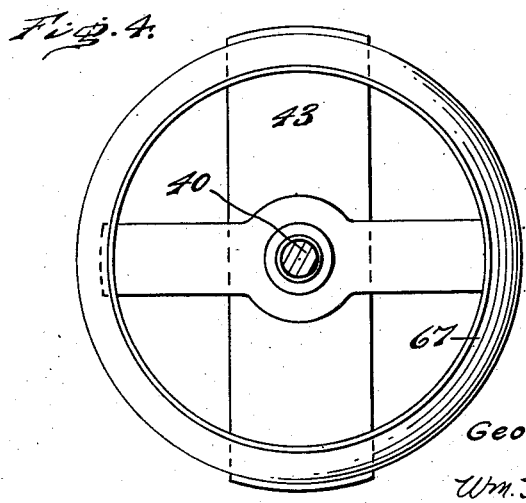
INVENTOR
George W. Middleton
BY
Wm. Steell Jackson and Sons
ATTORNEYS.

May 6, 1958  G. W. MIDDLETON  2,833,478
THERMOSTATIC CONTROL OF WATER COOLING SYSTEM OF MOTOR VEHICLE
Filed June 9, 1955  3 Sheets-Sheet 3
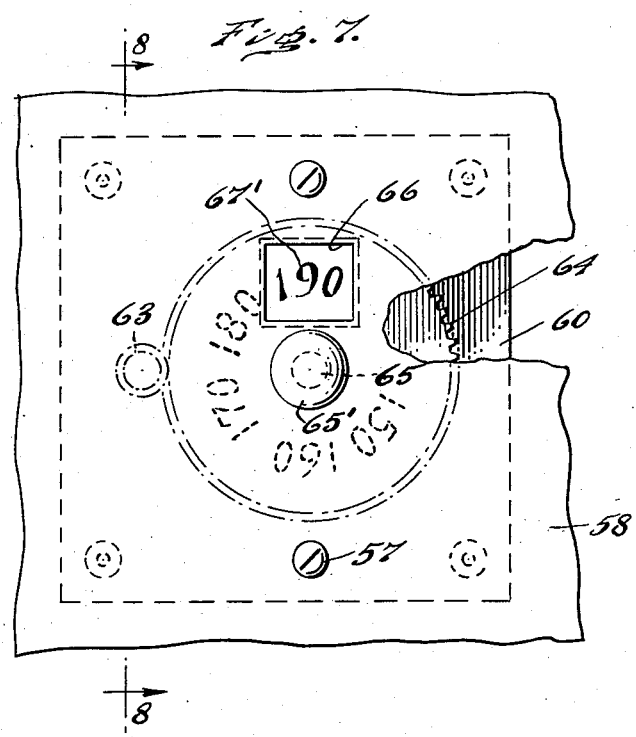
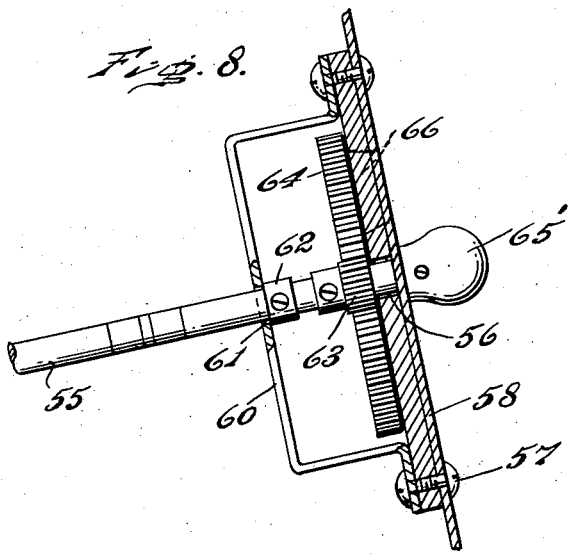
INVENTOR
George W. Middleton
BY
Wm. Steell Jackson and Sons.
ATTORNEYS.

2,833,478

THERMOSTATIC CONTROL OF WATER COOLING SYSTEM OF MOTOR VEHICLE

George W. Middleton, Riverside, N. J.

Application June 9, 1955, Serial No. 514,234

4 Claims. (Cl. 236—34)

The present invention relates to a thermostatic control device for the water cooling system of a motor vehicle.

The purpose of the invention is to permit manual control of the main thermostatic cut-off effect to vary the effective cut-off temperature, and also to relieve against cut-off when the thermostat is inoperative.

A further purpose is to move the thermostatically controlled valve of a thermostatic control device on an adjustment so that the relation of the valve to its seat can be changed and permit control of the adjustment from outside the thermostat housing.

A further purpose is to permit control of the adjustment from the dash board of the motor vehicle, preferably for control of the adjustment position in terms of operating temperature on the dash board.

A further purpose is to regulate the operating temperature of the cooling system while permitting independent control of the return from the car heater.

Further purposes appear in the specification and in the claims.

In the drawings, I have chosen to illustrate one only of the numerous embodiments in which my invention may appear, selecting the forms shown from the standpoints of satisfactory operation, convenience in illustration and clear demonstration of the principles involved.

Figure 1 is a partially diagrammatically central vertical section on the thermostatically controlled device of the invention, illustrating the thermostat in its low temperature retracted position with the main valve open and inoperative.

Figure 2 is a plan section on the line 2—2 of Figure 1.

Figure 3 is a plan section on the line 3—3 of Figure 1.

Figure 4 is a plan section on the line 4—4 of Figure 1.

Figure 5 is a fragmentary section corresponding to part of Figure 1, but shows the thermostatic element expanded, the heat return ports constricted and the main valve thermostatically opened.

Figure 6 is a fragmentary axial section similar to Figure 1, with the main valve thermostatically closed.

Figure 7 is a front elevation partially broken away showing the control and indicator on the dash board of the vehicle.

Figure 8 is a section on the line 8—8 of Figure 7.

Describing in illustration, but not in limitation and referring to the drawings.

Existing motor vehicle water control thermostats used in the cooling systems are subjected to two main limitations. The cooling capacity of various radiators differ due to the presence or absence of anti-freeze and the nature of the coolant used, and therefore, it is desirable under certain conditions to be able to control the operating temperature of the cooling system in reference to the ambient temperature and the motor performance. This is generally not possible, as the thermostat is set to operate under predetermined temperature conditions which cannot be adjusted.

Furthermore, the thermostat wholly or partially fails to function and becomes erratic, closed or open when this would be undesirable.

In accordance with the present invention, it would be possible to change the operating temperature of the thermostat, and this can be done from the dash board of the motor vehicle, desirably with an indication of the particular temperature setting.

Furthermore, it is possible to remove the thermostatic control from the main thermostatic control valve, and adjust the valve to a permanently open position, thus allowing for operation without the thermostat when the thermostat is wholly or partially inoperative.

The principles of the invention can be applied to any of a wide variety in a wide art of thermostatic devices of which I have illustrated one typical embodiment.

A suitable metallic housing 20 is provided with a lower inlet passage 21 connected to the engine head 22 of the motor vehicle engine, an outlet passage 23 connected to the top of the radiator, and a heater return passage 24 connected to the heater. It will be understood that water entering the passage 21 is pumped by the water pump and passes through the cooling chamber of the engine and some of it passes through the heater to the return 24.

A partition 25 extends across the housing, and carries at its lower surface, a gasket recess 26 which receives a suitable gasket 27 which seals to a seat 28 having a central opening 30 which forms the main passage of the housing.

The seat is formed from a stamping which is shouldered at 31 to engage and seal against the gasket and has an outwardly flared portion 32 flanged at 33 to seal in a recess 34 in the bottom of the housing. The flared portion is ported at 35 to permit connection to the heater return passage 24 and the space at the interior of the inlet passage 21.

A spider 36 is mounted as by spot welding 37 to the shouldered portion of the seat stamping and to cause a central opening 38 which guides a thermostat plunger 40. A thermostat 41 suitably of the bellows variety having an expansible fluid content mounts the plunger 40 and the thermostat is anchored by a rivet 42 to a yoke 43, the yoke being secured at the two sides as by rivets 44 to the seat stamping above described.

The plunger 40 mounts a stud 45 on its forward end, the stud being suitably threaded and pinned into a socket 46 on the end of the plunger. The stud at its outer end is threaded to valve 47 which suitably has an inverted disk portion which in one position cooperates with the seat 28 to close the main flow between the passages 21 and 23.

The valve 48 has a squared shank 50 providing a squared longitudinal socket 51 which receives an adjustment head 52 of similar configuration fitting inside the shank.

The head 52 is interconnected by universal joint 53 with a tube 54 which is in prolongation of a flexible shaft 55 and connected thereto by a sleeve 56. The tube 54 journals in a threaded sleeve 57, and the sleeve is anchored by packing bearings 58 and 60 on each side of the opening 61 through the housing, the packing rings being secured by nuts 62 and 63.

The outer end of the threaded sleeve 57 receives a threaded stuffing box 64 retaining packing 65 around the sleeve and journalling the sleeve against a thrust collar 66.

The thermostat also mounts a construction valve element 67 which cooperates with the interior wall of the seat flare at the ports 35 so that when the thermostat expands, the return flow from the heater will be restricted.

The flexible shaft 55 at its remote end is journalled in a plate 56 secured by bolts 57 to the dash board 58 of the motor vehicle, and also by a journal bracket 60 extending behind the dash board and having a journal opening 61. A collar 62 acts as a thrust bearing against the journal opening 61 and at the other end a flexible shaft carries a pinion 63 which acting against the plate provides a thrust bearing in the opposite direction. The pinion meshes with a gear 64 on an adjustment shaft 65 extending through the plate 56 and through the dash and carrying an adjustment handle 65' available to the operator at the dash.

The dash and the plate have a window 66 through which are visible temperature markings 67' on the gear.

In operation of the device, when the manual adjustment is not being used, and a low temperature is attained, the valve 47 closes against the seat 28 in Figure 6, as well known, cutting off flow between the inlet from the engine block and the radiator, while the valve constrictor 67 is retracted and the ports 35 are open.

On the other hand, using purely automatic operation without adjustment, when the thermostat is expanded to the predetermined extent, the valve 47 is opened in Figure 5, leaving free flow between the passage 21 and the engine and the passage 23 and the motor, while the valve restrictor 27 is in a position to restrict the flow from the heater return 24 to the ports 35. If the operator adjusts the handle 65' to change the temperature setting visible at the dash, the temperature of the water at which the thermostat will expand to change from the position of Figure 6 to the position of Figure 5 will adjust up or down as the case may be.

On the other hand, if the user desires to render the thermostatic device inoperative, he can draw the valve 47 far enough up on the stud so that the valve cannot close regardless of the thermostat position. This is shown in Figure 1, and this position could be used in case the thermostat was either broken or stuck.

It will be evident that when the valve constrictor 67 advances to a position far enough forward to restrict flow through the ports 35, the water in the system will be very hot, and therefore it will be desirable to cut off the flow of water through the heater so as to avoid excessive heating.

It will be evident that the exact adjustment can be varied by the user to suit the particular requirements of service and according to the gear ratio at the dash and the number of the threads on the adjusting stud will determine the relation between the turns of the adjustment handle and the change in operating temperature.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a thermostat for controlling flow of water through the radiator of a motor vehicle provided with an internal combustion engine, a housing having a passage adapted to be connected to the engine, an outlet passage adapted to be connected to the radiator and a valve seat interposed in the interior of the housing between the passage from the engine and the passage from the radiator, a thermostatic element secured to the housing in contact with the water therein on the side of the valve seat toward the passage adapted to be connected to the engine, a valve located in the housing on the side of the valve seat adjoining the outlet passage, cooperating with the valve seat, a valve operating rod interconnecting the thermostat and the valve and extending through the opening in the valve seat, said thermostatic element operating to move the valve away from the valve seat when the temperature of the element becomes sufficiently high, adjustment means interposed between the valve and the operating rod and changing the distance between the valve and the thermostat, a mechanism operated from outside the housing and controlling adjustment means to vary the position of the valve with respect to the valve seat at any particular temperature.

2. A thermostatic device of claim 1, in combination with means on the dash board of the motor vehicle for operating said mechanism.

3. A thermostatic device of claim 1 in which said mechanism operates at the dash board of the motor vehicle and includes indicating means for showing the relative adjustment position.

4. A thermostatic device of claim 1, in which the motor vehicle has a car heater, having a passage communicating between the housing and the return to the car heater, valve ports through which the return to the car heater passes from the housing, and a constrictor element mounted on and moving with the thermostat, cooperating with the valve ports to restrict the flow of water returning to the car heater when the water is hot.

References Cited in the file of this patent

UNITED STATES PATENTS

| | | |
|---|---|---|
| 1,745,622 | Jorgensen | Feb. 4, 1930 |
| 1,751,688 | Eggleston | Mar. 25, 1930 |
| 2,095,358 | Dube | Oct. 12, 1937 |
| 2,155,233 | Mantz | Apr. 18, 1939 |
| 2,296,641 | Hawkins | Sept. 22, 1942 |
| 2,750,117 | Pascolini | June 12, 1956 |

FOREIGN PATENTS

| | | |
|---|---|---|
| 903,580 | France | Jan. 22, 1954 |